United States Patent
Kanazawa et al.

(10) Patent No.: US 11,697,489 B2
(45) Date of Patent: Jul. 11, 2023

(54) WING, FLYING OBJECT, AND METHOD FOR MANUFACTURING A WING

(71) Applicant: MITSUBISHI HEAVY INDUSTRIES, LTD., Tokyo (JP)

(72) Inventors: Yu Kanazawa, Tokyo (JP); Kenta Katsunaga, Tokyo (JP); Koji Ogimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 135 days.

(21) Appl. No.: 17/233,743

(22) Filed: Apr. 19, 2021

(65) Prior Publication Data

US 2021/0362824 A1 Nov. 25, 2021

(30) Foreign Application Priority Data

May 25, 2020 (JP) .................. 2020-090775

(51) Int. Cl.
*B64C 3/28* (2006.01)
*F42B 10/06* (2006.01)

(52) U.S. Cl.
CPC ............... *B64C 3/28* (2013.01); *F42B 10/06* (2013.01)

(58) Field of Classification Search
CPC .............. B64C 3/28; B64C 5/08; F42B 10/06
See application file for complete search history.

(56) References Cited

U.S. PATENT DOCUMENTS

2012/0234967 A1* 9/2012 Christou .................. F16B 5/04
165/47
2016/0326896 A1 11/2016 Jamison

FOREIGN PATENT DOCUMENTS

JP 2016-211550 12/2016

* cited by examiner

*Primary Examiner* — Timothy D Collins
*Assistant Examiner* — Eric Acosta
(74) *Attorney, Agent, or Firm* — Wenderoth, Lind & Ponack, L.L.P.

(57) ABSTRACT

A wing includes: a main structural member; a leading-edge member formed of material with a coefficient of linear thermal expansion different from that of material of the main structural member; an eccentric bushing that has a circular through-hole and is shaped in a cylindrical shape; and a coupling member. The leading-edge member has a first hole prolonged in a specific direction. The main structural member has a second hole. The center axis of the eccentric bushing and the center axis of the through-hole are parallel to and offset from each other. The eccentric bushing is inserted to the first hole. The first coupling member is inserted to the through-hole and the second hole to couple the main structural member and the leading-edge member.

12 Claims, 10 Drawing Sheets

WING, FLYING OBJECT, AND METHOD FOR MANUFACTURING A WING

CROSS REFERENCE

This application claims priority of Japanese Patent Application No. 2020-090775, filed on May 25, 2020, the disclosure of which is incorporated herein by reference.

TECHNICAL FIELD

The present invention relates to a wing and a method for manufacturing the same, more particularly, to a wing with a leading edge formed of heat-resistant material and a method manufacturing the same.

BACKGROUND

The leading edge of a wing (e.g., a flight control surface) of a flying object that flies in the air at high speed is subjected to a high temperature environment due to aerodynamic heating. To be tolerant to the high temperature environment, a leading-edge member formed of heat resistive material different from material of the main structural member may be attached at the leading edge of the wing.

A coupling member such as rivets may be used to couple the main structural member and the leading-edge member. For example, through-holes may be formed through the main structural member and the leading-edge member, respectively, and the main structural member and the leading-edge member may be coupled by installing rivets through the through-holes.

In use of this structure, it is desired that the through-holes formed through the main structural member and the leading-edge member are aligned to each other; however, the through-holes may be misaligned in actual implementations.

One cause is aerodynamic heating in actual use. The main structural member and the leading-edge member exhibit thermal expansion when the temperature of the wing increases due to the aerodynamic heating. If the main structural member and the leading-edge member are formed of materials with different coefficients of linear thermal expansion, this may cause misalignment of the through-holes formed through the main structural member and the leading-edge member. The misalignment of the through-holes caused by the thermal expansion may cause undesired thermal stress.

Another cause is a machining error in the manufacturing process. A machining error may occur during drilling to form through-holes through the main structural member and the leading-edge member. The machining error may cause misalignment of the through-holes formed through the main structural member and the leading-edge member. Use of stack drilling for forming through-holes through the main structural member and the leading-edge member may mitigate the misalignment of the through-holes caused by the machining errors. Use of stack drilling for a large-sized member as a wing of a flying object may, however, cause difficulty in the process control.

It is noted that Japanese patent application publication No. 2016-211550 discloses a technique for coupling turbine components of different coefficients of linear thermal expansion with a fastener.

SUMMARY

Accordingly, one of objectives of the present invention is to provide a technique for mitigating misalignment of through-holes formed through a main structural member and a leading-edge member. Other objectives of the present invention would be understood by persons skilled in the art from the following disclosure.

In an aspect of the present invention, a wing includes: a main structural member; a leading-edge member formed of material with a coefficient of linear thermal expansion different from that of material of the main structural member; an eccentric bushing shaped in a cylindrical shape, wherein a circular through-hole is formed through the eccentric bushing; and a first coupling member. The leading-edge member has a first hole prolonged in a specific direction, and the main structural member has a second hole. The center axis of the eccentric bushing and the center axis of the through-hole are parallel to and offset from each other. The eccentric bushing is inserted to the first hole. The first coupling member is inserted to the through-hole of the eccentric bushing and the second hole of the main structural member to couple the main structural member and the leading-edge member.

In one embodiment, the main structural member may include a first flange portion through which the second hole is formed; and a second flange portion positioned opposed to the first flange portion, the second flange portion having a third hole. The leading-edge member may include an insert through which the first hole is formed, and the insert may be inserted to a recess formed between the first flange portion and the second flange portion. In this case, the first coupling member is inserted also to the third hole.

In one embodiment, the leading-edge member may include: a body having an opposing face opposed to the main structural member; and a protrusion disposed to protrude from the opposing face of the body, wherein the first hole is formed through the protrusion. In this case, it is preferable that the main structural member and the leading-edge member are coupled such that a gap is disposed between the main structural member and the leading-edge member.

In one embodiment, the wing may further include a second coupling member. The leading-edge member may have a fourth hole with a circular shape at a position closer to a wing root of the wing than that of the first hole, and the main structural member may have a fifth hole with a circular shape at a position closer to the wing root than that of the second hole. In this case, the second coupling member is inserted to the fourth hole and the fifth hole to couple the main structural member and the leading-edge member.

In this case, the wing may further include a third coupling member in one embodiment. The leading-edge member may have a sixth hole with a circular shape at a position between the first hole and the fourth hole, and the main structural member may have a seventh hole with a circular shape at a position between the second hole and the fifth hole. The third coupling member may be inserted to the sixth hole and the seventh hole to couple the main structural member and the leading-edge member.

Such structure of the wing is especially useful for the case where the leading-edge member is formed of heat resistant material.

In another aspect of the present invention, a flying object includes a fuselage and a wing. The wing includes: a main structural member; a leading-edge member formed of material with a coefficient of linear thermal expansion different from that of material of the main structural member; an eccentric bushing having a circular through-hole and shaped in a cylindrical shape; and a coupling member. The leading-edge member has a first hole prolonged in a specific direction, and the main structural member has a second hole. The center axis of the eccentric bushing and the center axis of the through-hole are parallel to and offset from each other. The eccentric bushing is inserted to the first hole of the leading-edge member. The coupling member is inserted to the through-hole and the second hole to couple the main structural member and the leading-edge member.

In still another aspect of the present invention, a method for manufacturing a wing is provided. The method includes: preparing a main structural member, a leading-edge member formed of material with a coefficient of linear thermal expansion different from that of material of the main structural member, and an eccentric bushing shaped in a cylindrical shape and having a circular through-hole, the eccentric bushing having a center axis parallel to and offset from a center axis of the through-hole; forming a first hole through the leading-edge member, the first hole being prolonged in a specific direction; forming a second hole through the main structural member; inserting the eccentric bushing to the first hole; and inserting a coupling member to the through hole and the second hole to couple the main structural member and the leading-edge member.

The first hole of the leading-edge member and the second hole of the main structural member are formed in a state in which the main structural member and the leading-edge member do not overlap each other.

The present invention provides a technique for mitigating misalignment of through-holes formed through the main structural member and the leading-edge member.

DETAILED DESCRIPTION

A description is given below of embodiments of the present invention with reference to the attached drawings. For easiness of understanding of technologies disclosed in the embodiments, dimensions of components may not be drawn to scale in the attached drawings.

Figure 1:
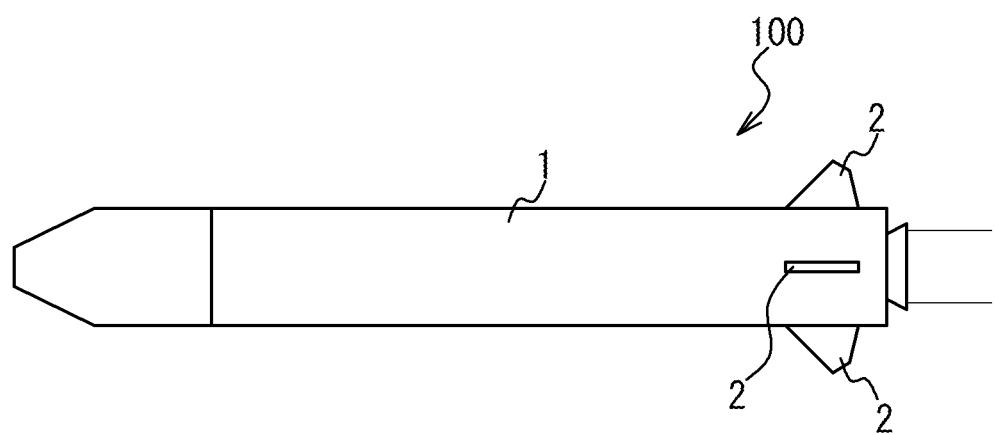
FIG. 1 is a side view schematically illustrating an example configuration of a flying object, according to one embodiment.

FIG. 1 is a section view schematically illustrating an example configuration of a flying object 100, according to one embodiment. The flying object 100 includes a fuselage 1 on which an engine configured to produce propulsion is mounted and wings 2 coupled to the fuselage 1. The wings 2 may be configured as flight control surfaces that control the flying direction of the flying object 100.

Figure 2:
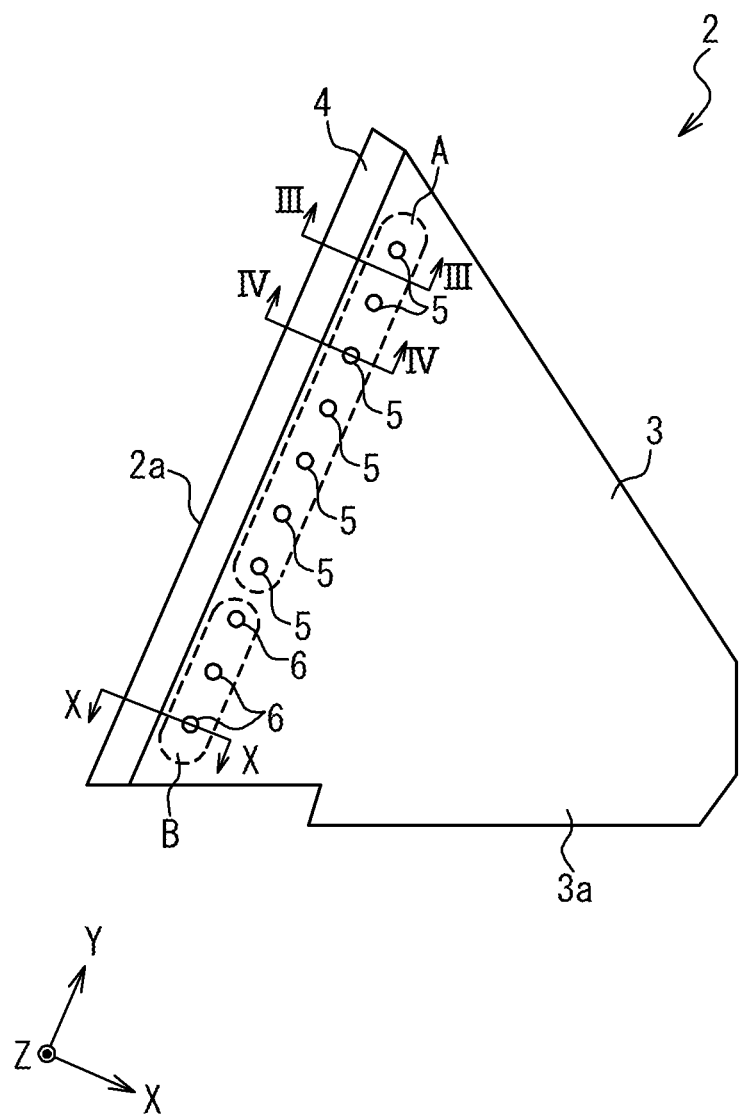
FIG. 2 is a side view illustrating an example configuration of a wing, according to one embodiment.

FIG. 2 is a side view illustrating an example configuration of a wing 2. The wing 2 includes a main structural member 3 and a leading-edge member 4. The main structural member 3 includes a wing root portion 3a and the wing 2 is coupled to the fuselage 1 on the wing root portion 3a. The main structural member 3 functions as a structural member of the wing 2.

The leading-edge member 4, which forms the leading edge 2a of the wing 2, is coupled to the main structural member 3. In this embodiment, the leading-edge member 4 is formed of heat-resistant material to allow the wing 2 to be tolerant to a temperature elevation caused by aerodynamic heating. The leading-edge member 4 may be formed of, for example, tungsten, molybdenum, alumina ($Al_2O_3$), titanium aluminum (TiAl) alloy, titanium zirconium molybdenum (TZM), zirconium diboride ($ZrB_2$), carbon, silicon carbide (SiC), silicon nitride ($Si_3N_4$), or the like. Heat resistive material, which is often brittle while exhibiting high heat resistance, may not be suitable for use for the main structural member 3. The leading-edge member 4 is therefore formed of material different from that of the main structural member 3 in this embodiment. As a result, the materials of the main structural member 3 and the leading-edge member 4 have different coefficients of linear thermal expansion.

A description is then given of the configuration of the wing 2. In the following, an XYZ Cartesian coordinate system may be used to indicate directions. The Y axis is defined in the direction in which the leading-edge member 4 extends, and the X axis is defined in the direction perpendicular to the Y axis and contained in the surface of the wing 2. Further, the Z axis is defined in the direction perpendicular to the X axis and the Y axis.

Figure 3:
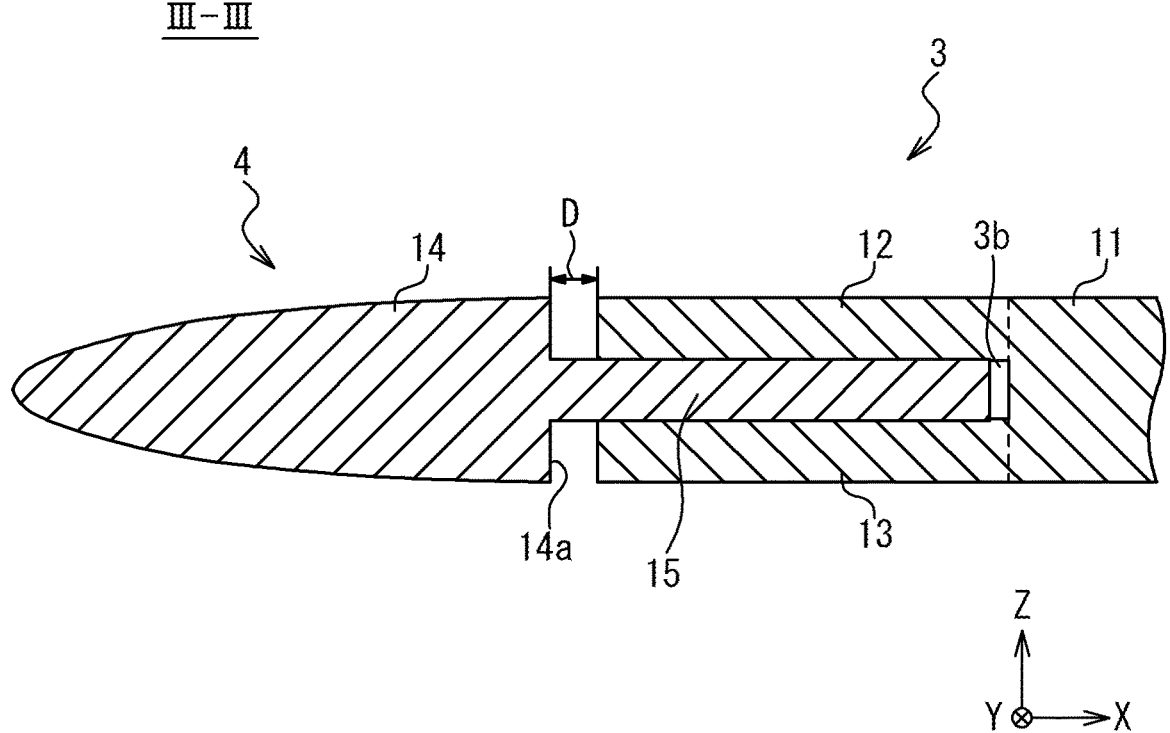
FIG. 3 is a section view illustrating example configurations of a main structural member and a leading-edge member on section according to one embodiment.

FIG. 3 is a section view illustrating an example configuration of the main structural member 3 and the leading-edge member 4. The main structuring member 3 includes a body 11 and a pair of flange portions 12 and 13 that protrude from the body 11 in the −X direction. The leading-edge member 4 includes a body 14 and an insert 15. The body 14 has an opposing face 14a opposed to the flange portions 12 and 13. The insert 15 is formed to protrude from the opposing face 14a. The insert 15 is inserted to a recess 3b formed between the flange portions 12 and 13 of the main structural member 3.

Referring back to FIG. 2, the leading-edge member 4 is coupled to the main structure member 3 with rivet-based coupling mechanisms 5 and 6. The rivet-based coupling mechanisms 5 are disposed in a region A away from the wing root of the wing 2, while the rivet-based coupling mechanisms 6 are disposed in a region B near the wing root. As described later, the rivet-based coupling mechanisms 5, which are disposed in the region A away from the wing root, may be configured differently from the rivet-based coupling mechanisms 6, which are disposed in the region B near the wing root. Although seven rivet-based coupling mechanisms 5 and three rivet-based coupling mechanisms 6 are illustrated in FIG. 2, the number of the rivet-based coupling mechanisms 5 is not limited to seven and the number of the rivet-based coupling mechanisms 6 is not limited to three.

Figure 4:
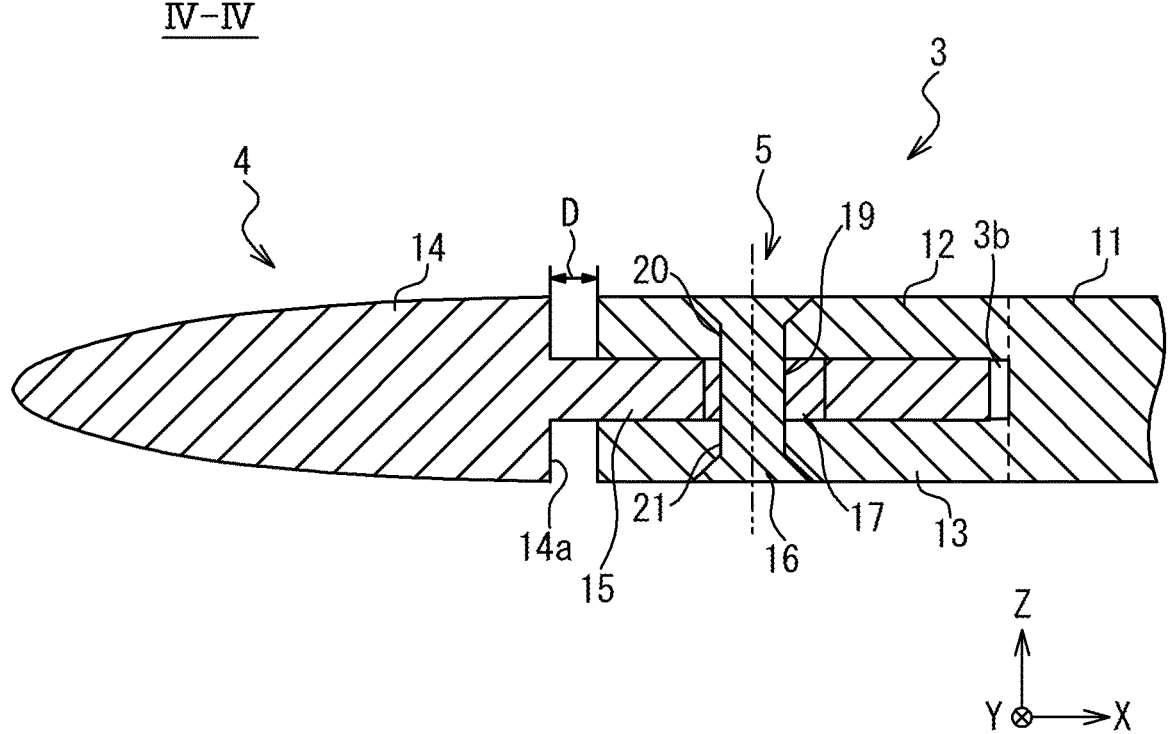
FIG. 4 is a section view illustrating an example configuration of a rivet-based coupling mechanism disposed in a region away from a wing root on section IV-IV, according to one embodiment.

FIG. 4 is a section view illustrating an example configuration of the rivet-based coupling mechanisms 5. The rivet-based coupling mechanisms 5 each include a rivet 16 and an eccentric bushing 17. The rivet 16 is a coupling member configured to couple the flange portions 12 and 13 of the main structural member 3 to the insert 15 of the leading-edge member 4. As described later in detail, the eccentric bushing 17 has the function of adjusting the position at which the rivet 16 penetrates the insert 15.

Figure 5:
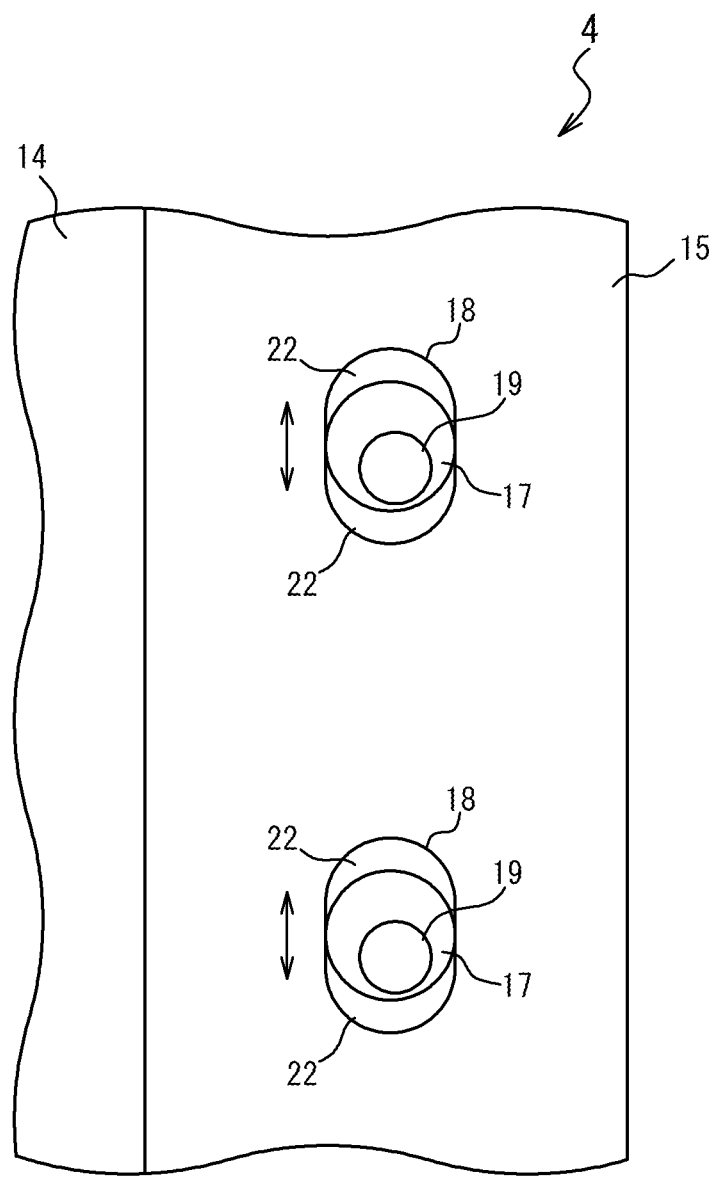
FIG. 5 is a side view illustrating example configurations of an insert of a leading-edge member and an eccentric bushing, according to one embodiment.
Figure 5:
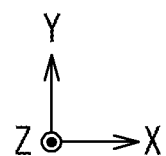
Figure 6:
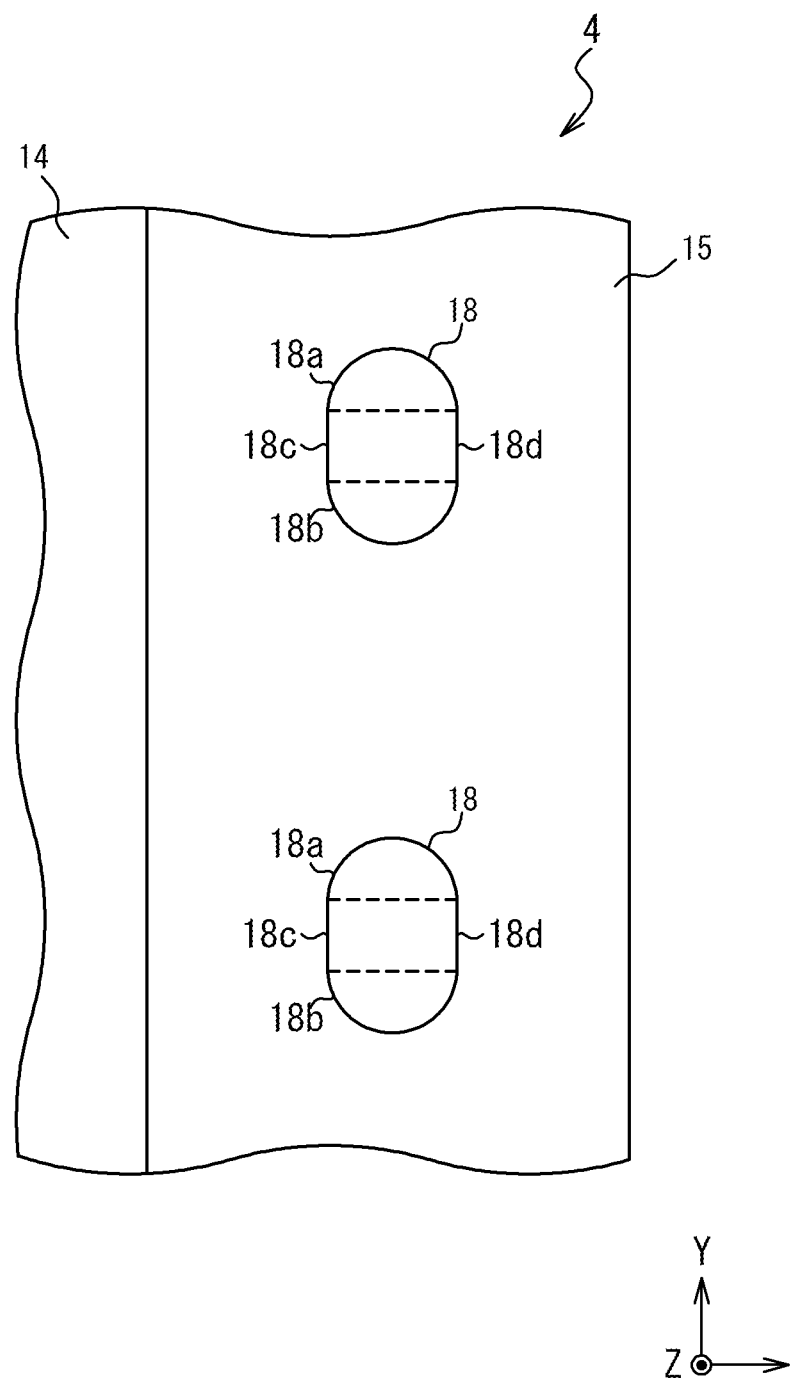
FIG. 6 is a side view illustrating an example configuration of slotted holes formed through an insert of a leading-edge member, according to one embodiment.

FIG. 5 is a side view illustrating example configurations of the insert 15 of the leading-edge member 4 and the eccentric bushings 17. Slotted holes 18 are formed through the insert 15. In one embodiment, the slotted holes 18 are formed to be prolonged in a specific direction, in this embodiment, in the Y axis direction, which is the direction in which the leading-edge member 4 is extended. Specifically, as illustrated in FIG. 6, the side wall of each slotted hole 18 includes semi-cylindrical portions 18a and 18b and flat portions 18c and 18d. The semi-cylindrical portions 18a and 18b are shaped semi-cylindrically and curved in opposite directions, while the flat portions 18c and 18d are flat-shaped. The respective ends of the semi-cylindrical portions 18a are connected to the respective ends of the semi-cylindrical portions 18b with the flat portions 18c and 18d disposed therebetween.

Figure 7:
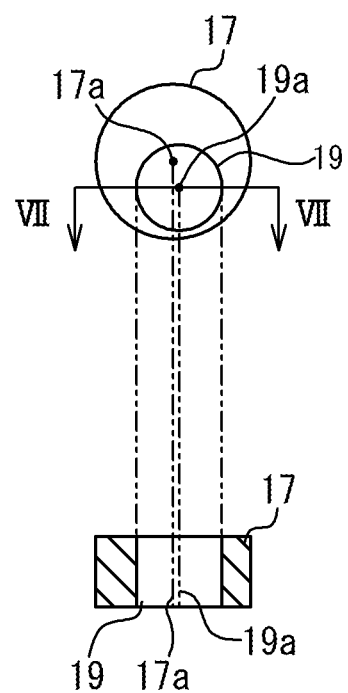
FIG. 7 is a combined illustration of a side view illustrating an example configuration of an eccentric bushing and a section view illustrating an example configuration of the eccentric bushing on section VII-VII, according to one embodiment.

As illustrated in FIG. 4, the eccentric bushings 17 have a thickness corresponding to that of the insert 15, in this embodiment, the same thickness as that of the insert 15. As illustrated in FIG. 5, the eccentric bushings 17 are inserted to the slotted holes 18. As illustrated in FIG. 7, each eccentric bushing 17 is shaped in a cylindrical shape, having a circular through-hole 19 that penetrates the eccentric bushing 17. The eccentric bushings 17 are formed to have a diameter substantially equal to the diameter of the semi-cylindrical portions 18a and 18b of the slotted holes 18. The term "substantially" referred herein means to include the case where the eccentric bushings 17 are formed such that the diameter of the eccentric bushings 17 is slightly smaller than that of the semi-cylindrical portions 18a and 18b of the slotted holes 18 to allow the eccentric bushings 17 to be inserted to the slotted holes 18 in the manufacturing process. The center axis 17a of each eccentric bushing 17 and the center axis 19a of the through-hole 19 are parallel to but offset from each other.

As illustrated in FIG. 4, the rivet 16 is inserted to the holes 20 and 21 of the flange portions 12 and 13 and the through-hole 19 of the eccentric bushing 17 to couple the leading-edge member 4 to the main structural member 3.

In this structure, the position of the through-hole 19 of the eccentric bushing 17 has degrees of freedom in two directions, the X axis direction and the Y axis direction. The position of the through-hole 19 in the X axis direction is adjustable by rotating the eccentric bushing 17 around the Z axis. Meanwhile, the position of the through-hole 19 in the Y axis direction is adjustable by adjusting the position of the eccentric bushing 17 in the Y-axis direction. Further, the position of the through-hole 19 in the Y axis direction is adjustable also by adjusting the direction of the eccentric bushing 17, that is, by rotating the eccentric bushing 17 around the Z axis.

The direction in which the slotted holes 18 are prolonged may be any direction in the XY plane in the viewpoint of offering degrees of freedom in the X axis direction and the Y axis direction to the position of the through-hole 19 to which the rivet 16 is inserted. It is however preferable that the slotted holes 18 are prolonged in the same direction as the direction in which the leading-edge member 4 extends, that is, the Y axis direction, in the viewpoint of absorption of the difference in the coefficient of linear thermal expansion between the main structural member 3 and the leading-edge member 4.

Further, the slotted holes 18 may be shaped in a different shape, not limited to the oval shape illustrated in FIG. 6, in the viewpoint of offering degrees of freedom in the X axis direction and the Y axis direction to the position of the through-hole 19. For example, the slotted holes 18 may be shaped in an elliptic shape prolonged in a specific direction. It is noted however that the slotted holes 18 with the oval shape illustrated in FIG. 6 are advantageous for offering degrees of freedom to the position of the through-hole 19 of the eccentric bushing 17 while reducing wobbling of the eccentric bushing 17.

Figure 8:
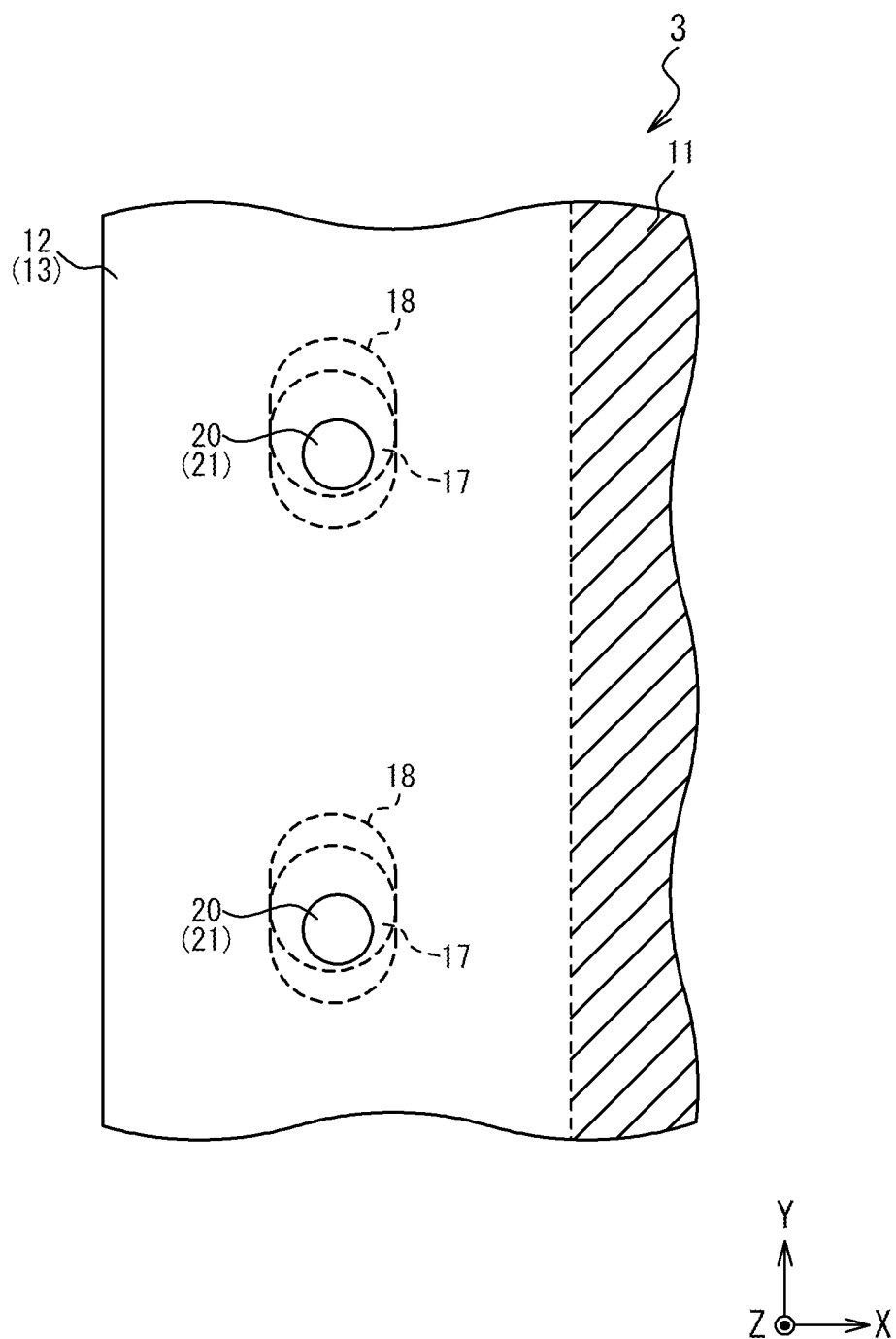
FIG. 8 is an exploded view illustrating an example configuration of a flange portion of a main structural member, according to one embodiment.

FIG. 8 is an exploded view illustrating an example configuration of the flange portion 12 of the main structural member 3 with the flange portion 13 removed. The flange portion 12 have holes 20 through which rivets 16 are installed. The holes 20 are formed at positions corresponding to those of the slotted holes 18 disposed through the insert 15 of the leading-edge member 4. In FIG. 8, the dotted lines indicate the positions of the slotted holes 18 and the eccentric bushings 17 inserted to the slotted holes 18. The flange portion 13 is configured identically to the flange portion 12, having holes 21 therethrough. The holes 21 are formed also at the positions corresponding to those of the slotted holes 18 disposed through the insert 15 of the leading-edge member 4.

The rivet-based coupling mechanisms 5 thus structured can absorb the difference in the coefficient of linear thermal expansion between the main structural member 3 and the leading-edge member 4 when the temperature of the wing 2 increases in actual use due to aerodynamic heating. The difference in the coefficient of linear thermal expansion between the main structural member 3 and the leading-edge member 4 may cause a difference in the magnitude of the thermal expansion in the Y axis direction between the main structural member 3 and the leading-edge member 4. The rivet-based coupling mechanisms 5 however suppress thermal stress applied to the rivets 16 in spite of the difference in the magnitude of the thermal expansion, since there are allowances 22 in the slotted holes 18 as illustrated in FIG. 5, the allowances 22 enabling the eccentric bushings 17 to move in the Y axis direction.

The structure in which the gap D is disposed between the body 14 of the leading-edge member 4 and the flange portions 12 and 13 of the main structural member 3 also contributes to absorption of the difference in the coefficient of linear thermal expansion between the main structural member 3 and the leading-edge member 4. The gap D prevents the body 14 of the leading-edge member 4 from being made in contact with the flange portions 12 and 13 of the main structural member 3 even when there occurs a difference in the magnitude of the thermal expansion in the X axis direction between the main structural member 3 and the leading-edge member 4. This prevents thermal stress from being exerted on the rivets 16.

Figure 9:
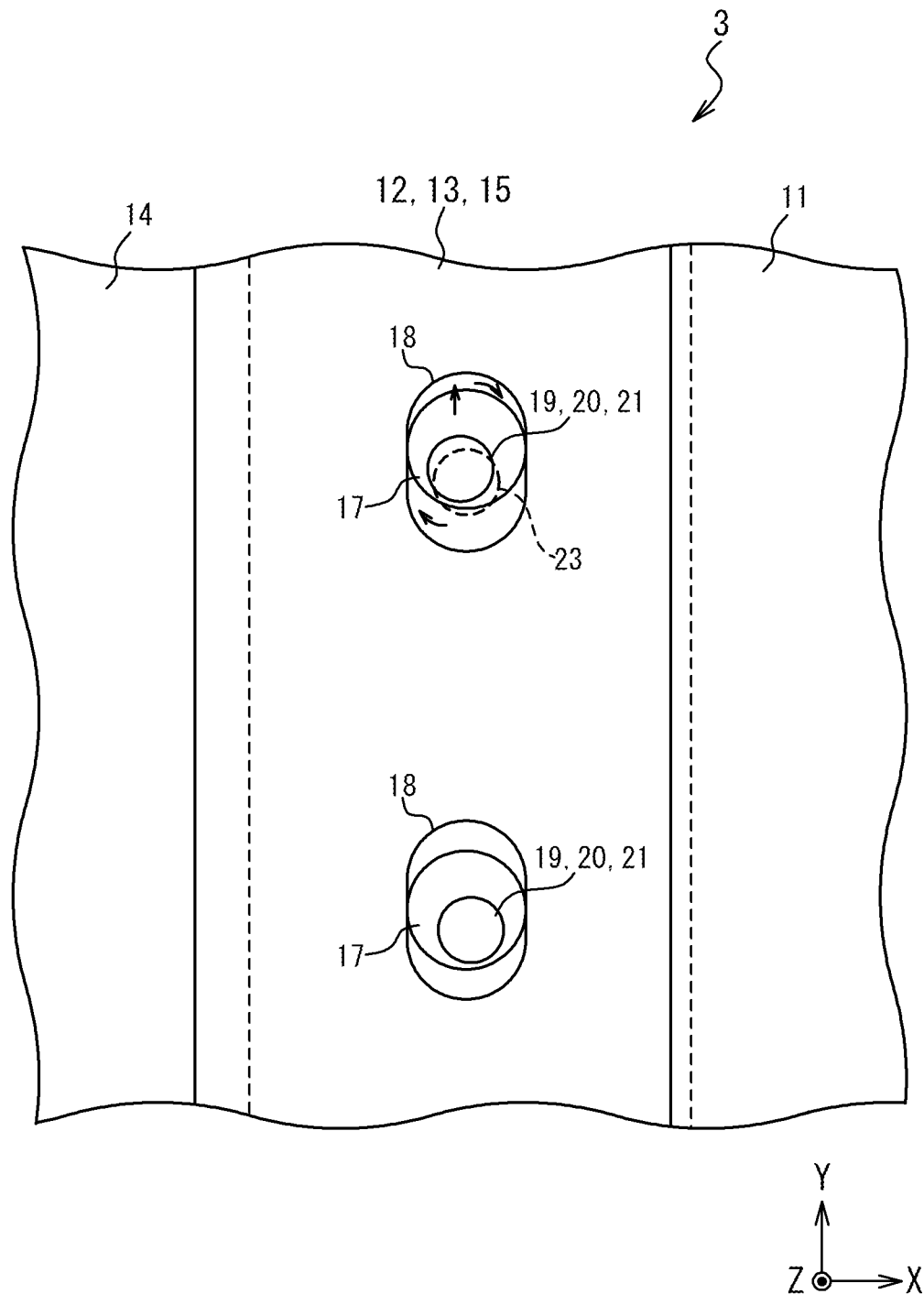
FIG. 9 is a side view illustrating example adjustment of the position and direction of an eccentric bushing of a rivet-based coupling mechanism, according to one embodiment.

Further, when the holes 20 and 21 formed through the flange portions 12 and 13 of the main structural member 3 are mispositioned due to manufacturing errors, the rivet-based coupling mechanisms 5 can absorb the mispositioning of the holes 20 and 21. Let us consider the case, for example, where the holes 20 and 21 are desired to be formed at the position indicated by the dotted line 23 through the flange portions 12 and 13 of the main structural member 3 but are formed at the position offset from the dotted line 23 in both the X axis direction and the Y axis direction as illustrated in FIG. 9. In this case, it is possible to align the position of the through-hole 19 of the eccentric bushing 17 to the actual position at which the holes 20 and 21 are formed by adjusting the position of the eccentric bushing 17 in the Y axis direction and further adjusting the direction of the eccentric bushing 17 (that is, rotating the eccentric bushing 17 around the center axis 17a). As such, the rivet-based coupling mechanisms 5 can absorb the manufacturing errors of the positions of the holes 20 and 21 formed through the flange portions 12 and 13.

The above-described rivet-based coupling mechanisms 5 may cause wobbling between the main structural member 3 and the leading-edge member 4. If the wobbling may cause any undesired effect such as deformation of the wing 2, in one embodiment, the rivet-based coupling mechanisms 6, which are disposed near the wing root of the wing 2, may be structured such that the main structural member 3 and the leading-edge member 4 are coupled with rivets installed through holes formed by stack drilling through the main structural member 3 and the leading-edge member 4.

Figure 10:
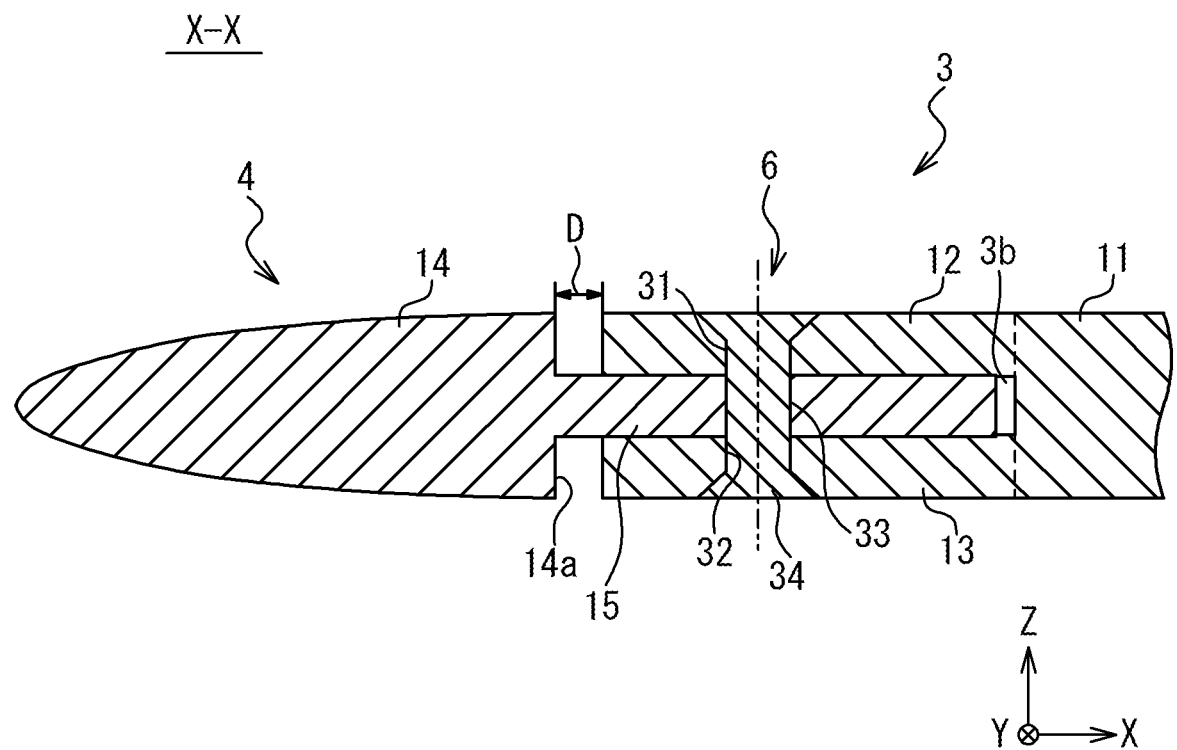
FIG. 10 is a section view illustrating an example configuration of a rivet-based coupling mechanism disposed in a region near a wing root on section X-X, according to one embodiment.

FIG. 10 is a section view illustrating an example configuration of a rivet-based coupling mechanism 6 thus configured. Circular holes 31, 32, and 33 are formed through the flange portions 12 and 13 of the main structural member 3 and the insert 15 of the leading-edge member 4, respectively, by stack drilling. The main structural member 3 and the leading-edge member 4 are coupled with rivets 34 inserted to the holes 31, 32, and 33.

Referring to FIG. 2, the rivet-based coupling mechanism 6 closest to the wing root is used as a reference of the positions of other rivet-based coupling mechanisms 5 and 6. Other rivet-based coupling mechanisms 6 have a role of reducing the wobbling by avoiding the rotation of the leading-edge member 4 with respect to the main structural member 3. For the rivet-based coupling mechanisms 6, which are disposed in the region B near the wing root, the thermal stress caused by the difference in the coefficient of linear thermal expansion between the main structural member 3 and the leading-edge member 4 does not cause a significant issue. Meanwhile, the thermal stress caused by the difference in the coefficient of linear thermal expansion may cause a significant issue for the region A, which is positioned further from the wing root than the rivet-based coupling mechanisms 6. In the region A thus positioned, the rivet-based coupling mechanisms 5 are used to absorb the difference in the coefficient of linear thermal expansion and the manufacturing errors.

Figure 11:
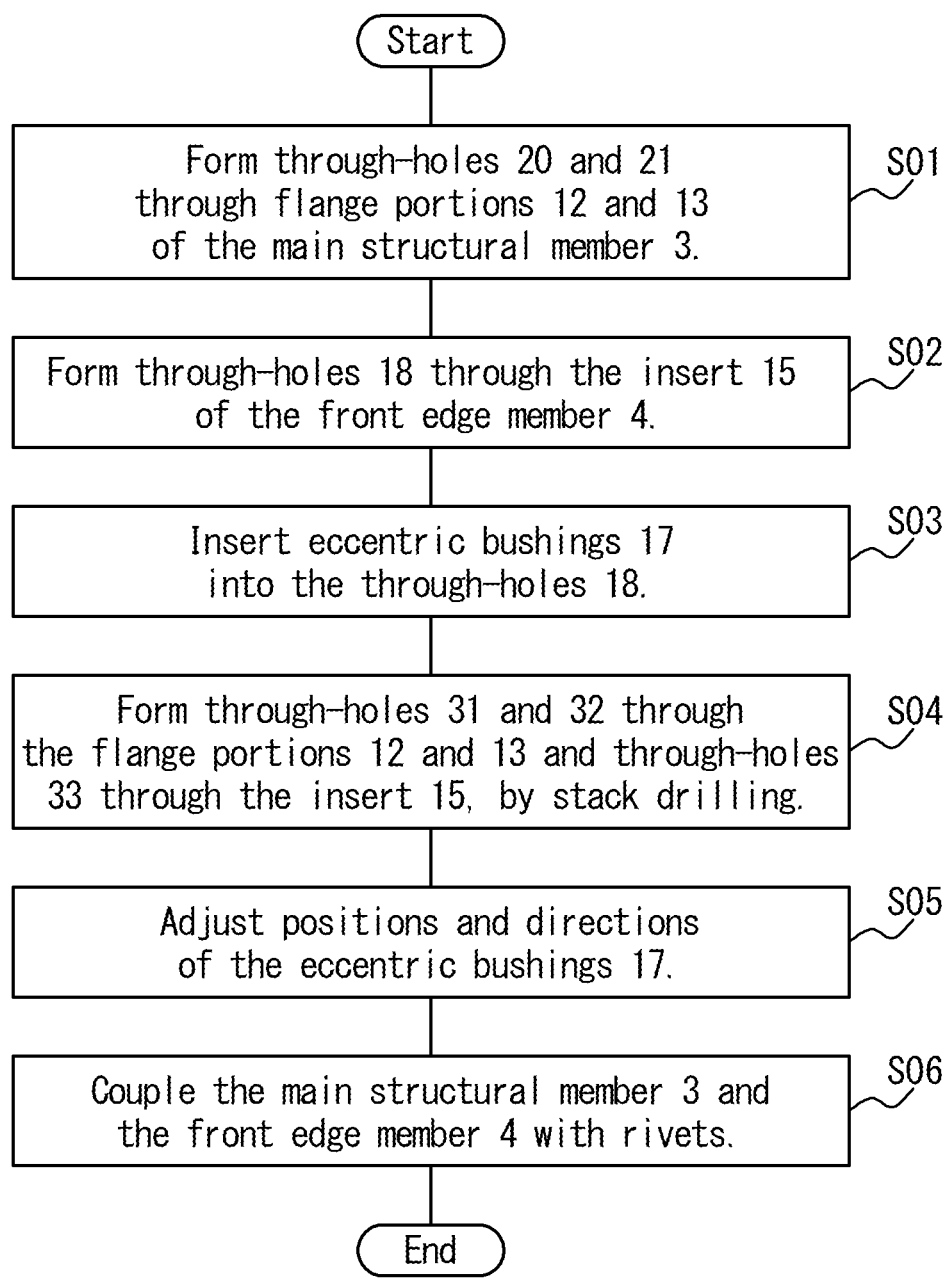
FIG. 11 is a flow chart illustrating an example method for manufacturing a wing, according to one embodiment.

FIG. 11 is a flowchart illustrating an example manufacturing method of a wing 2 that includes rivet-based coupling mechanisms 5 configured as illustrated in FIGS. 4 to 9 and rivet-based coupling mechanisms 6 configured as illustrated in FIG. 10. A series of steps described below are performed after preparing the main structural member 3, the leading-edge member 4, and the eccentric bushings 17.

Steps S01 to S03 are manufacturing steps for forming the rivet-based coupling mechanisms 5, which are positioned in the region A away from the wing root.

At step S01, the circular holes 20 and 21 are formed through the flange portions 12 and 13 of the main structural member 3. At step S02, the slotted holes 18 are formed through the insert 15 of the leading-edge member 4. Stack drilling is not used at steps S01 and S02; the formation of the holes 20 and 21 through the flange portions 12 and 13 and the formation of the slotted holes 18, which are shaped in the oval shape, through the insert 15 are performed individually between the main structural member 3 and the leading-edge member 4. In other words, the holes 20 and 21 of the flange portions 12 and 13 and the slotted holes 18 of the insert 15 are formed in the state in which the flange portions 12 and 13 of the main structural member 3 and the insert 15 of the leading-edge member 4 do not overlap each other (that is, in the state in which the insert 15 is not inserted to the recess 3b of the main structural member 3.)

At step S03, the eccentric bushings 17 are inserted to the slotted holes 18 of the insert 15 of the leading-edge member 4.

At step S04, for forming the rivet-based coupling mechanisms 6, which is positioned in the region B near the wing root, the circular holes 31 and 32 are formed through the flange portions 12 and 13 of the main structural member 3, and the circular holes 33 are formed through the insert 15 of the leading-edge member 4. The holes 31, 32, and 33 are formed by stack drilling in the state in which the flange portions 12 and 13 of the main structural member 3 and the insert 15 of the leading-edge member 4 overlap each other (that is, in the state in which the insert 15 is inserted to the recess 3b of the main structural member 3.)

At step S05, the positions and directions of the eccentric bushings 17 are adjusted to achieve alignment to the holes 20 and 21 formed through the flange portions 12 and 13 at step S01.

At step S06, the rivets 16 of the rivet-based coupling mechanisms 5 and the rivets 34 of the rivet-based coupling mechanism 6 are installed. This achieves coupling the flange portions 12 and 13 of the main structural member 3 to the insert 15 of the leading-edge member 4.

The manufacturing method according to this embodiment makes it possible to manufacture the wing 2 such that the wing 2 is adapted to the misalignment of the holes formed through the main structural member 3 and the leading-edge member 4 resulting from the difference in the coefficient of linear thermal expansion and/or the manufacturing errors. Furthermore, the manufacturing method according to this embodiment makes it possible to reduce wobbling between the main structural member 3 and the leading-edge member 4 while reducing the number of holes formed by stack drilling.

It is noted that the order in which steps S01 to S06 are performed is not limited to that illustrated in FIG. 11; the order may be changed as long as the change is technically acceptable.

While embodiments of the present invention have been specifically described in the above, the present invention must not be construed as being limited to the above-described embodiments. Persons skilled in the art would appreciate that the present invention may be implemented with various modifications.

What is claimed is:
1. A wing, comprising:
   a main structural member;

a leading-edge member formed of material with a coefficient of linear thermal expansion different from that of material of the main structural member;
an eccentric bushing shaped in a cylindrical shape, wherein a circular through-hole is formed through the eccentric bushing; and
a first coupling member,
wherein the leading-edge member has a first hole elongated in a specific direction,
wherein the main structural member has a second hole,
wherein a center axis of the eccentric bushing and a center axis of the through-hole are parallel to and offset from each other,
wherein the eccentric bushing is inserted in the first hole, and
wherein the first coupling member is inserted in the through-hole and the second hole to couple the main structural member and the leading-edge member.

2. The wing according to claim 1, wherein the main structural member comprises:
a first flange portion through which the second hole is formed; and
a second flange portion positioned opposed to the first flange portion, wherein a third hole is formed through the second flange portion,
wherein the leading-edge member comprises an insert through which the first hole is formed,
wherein the insert is inserted in a recess formed between the first flange portion and the second flange portion, and
wherein the first coupling member is inserted in the third hole.

3. The wing according to claim 1, wherein the leading-edge member comprises:
a body having an opposing face opposed to the main structural member; and
a protrusion disposed to protrude from the opposing face of the body, wherein the first hole is formed through the protrusion, and
wherein the main structural member and the leading-edge member are coupled such that a gap is disposed between the main structural member and the leading-edge member.

4. The wing according to claim 1, further comprising a second coupling member,
wherein the leading-edge member has a fourth hole with a circular shape at a position closer to a wing root of the wing than that of the first hole,
wherein the main structural member has a fifth hole with a circular shape at a position closer to the wing root than that of the second hole, and
wherein the second coupling member is inserted in the fourth hole and the fifth hole to couple the main structural member and the leading-edge member.

5. The wing according to claim 4, further comprising a third coupling member,
wherein the leading-edge member has a sixth hole with a circular shape at a position between the first hole and the fourth hole,
wherein the main structural member has a seventh hole with a circular shape at a position between the second hole and the fifth hole, and
wherein the third coupling member is inserted in the sixth hole and the seventh hole to couple the main structural member and the leading-edge member.

6. The wing according to claim 1, wherein the leading-edge member is formed of heat resistant material.

7. A flying object, comprising:
a fuselage; and
a wing, comprising:
a main structural member;
a leading-edge member formed of material with a coefficient of linear thermal expansion different from that of material of the main structural member;
an eccentric bushing shaped in a cylindrical shape, wherein a circular through-hole is formed through the eccentric bushing; and
a first coupling member,
wherein the leading-edge member has a first hole elongated in a specific direction,
wherein the main structural member has a second hole,
wherein a center axis of the eccentric bushing and a center axis of the through-hole are parallel to and offset from each other,
wherein the eccentric bushing is inserted in the first hole, and
wherein the first coupling member is inserted in the through-hole and the second hole to couple the main structural member and the leading-edge member.

8. The flying object according to claim 7, wherein the main structural member comprises:
a first flange portion through which the second hole is formed; and
a second flange portion positioned opposed to the first flange portion, the second flange portion having a third hole,
wherein the leading-edge member comprises an insert through which the first hole is formed,
wherein the insert is inserted in a recess formed between the first flange portion and the second flange portion, and
wherein the first coupling member is inserted in the third hole.

9. The flying object according to claim 7, wherein the leading-edge member is formed of heat resistant material.

10. A method of manufacturing a wing, comprising:
preparing a main structural member, a leading-edge member formed of material with a coefficient of linear thermal expansion different from that of material of the main structural member, and an eccentric bushing shaped in a cylindrical shape, wherein the eccentric bushing has a circular through-hole, and wherein the eccentric bushing has a center axis parallel to and offset from a center axis of the through-hole;
forming a first hole through the leading-edge member, the first hole being elongated in a specific direction;
forming a second hole through the main structural member;
inserting the eccentric bushing in the first hole; and
inserting a coupling member in the through hole and the second hole to couple the main structural member and the leading-edge member.

11. The method according to claim 10, wherein the first hole and the second hole are formed in a state in which the main structural member and the leading-edge member do not overlap each other.

12. The method according to claim 10, wherein the leading-edge member is formed of heat resistant material.

* * * * *